Nov. 4, 1958      E. V. SZLAGA      2,858,683
TIMING DEVICE FOR FUEL INJECTION PUMP
Filed April 11, 1956      2 Sheets-Sheet 1
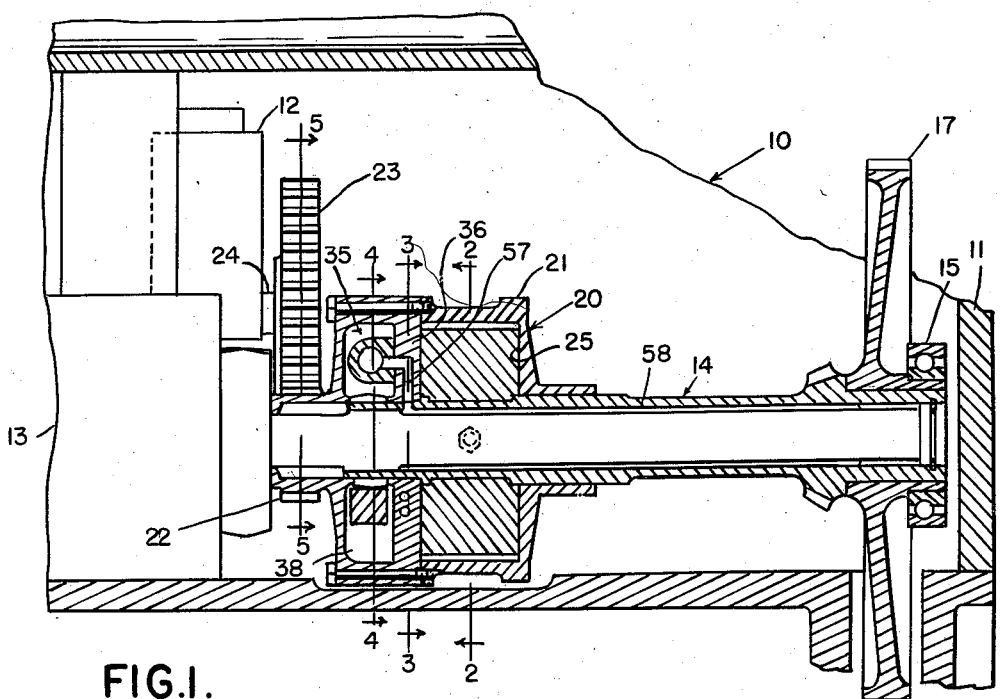
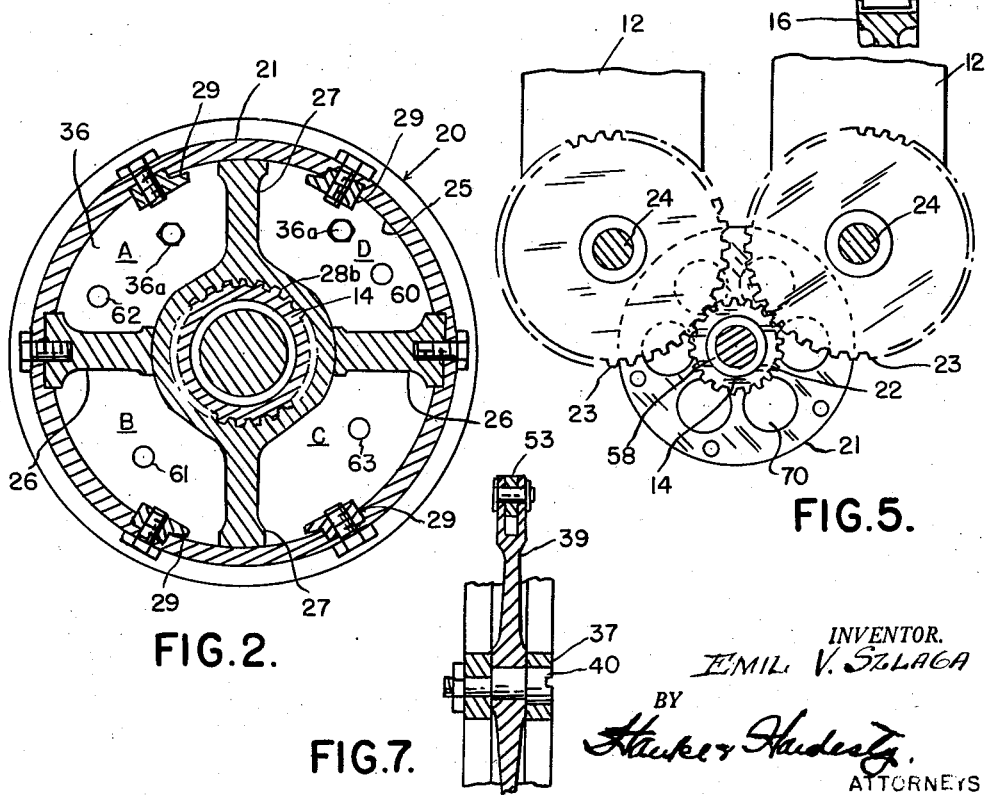
INVENTOR.
EMIL V. SZLAGA
BY
Hauker Hardesty
ATTORNEYS

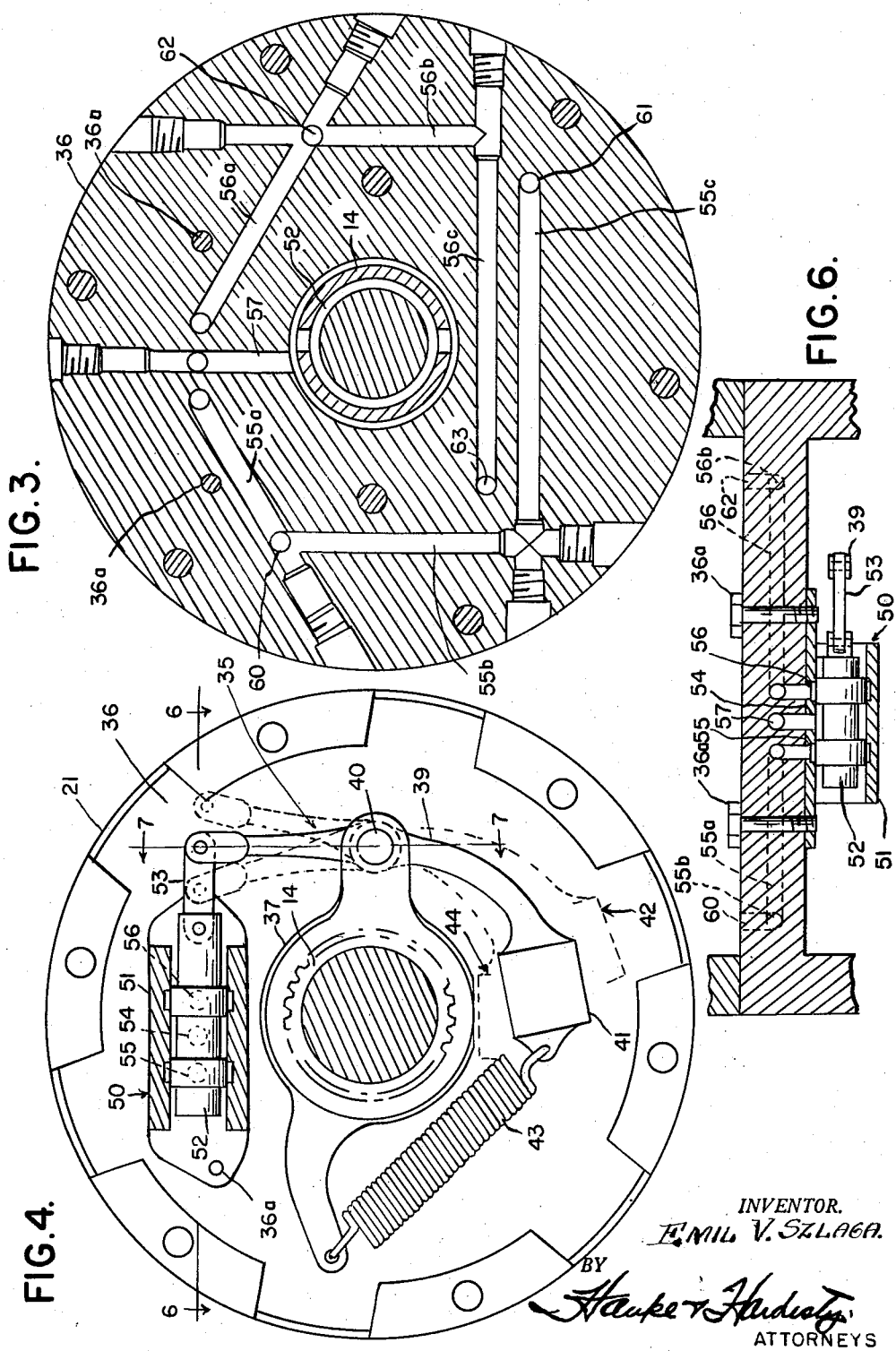

United States Patent Office 2,858,683
Patented Nov. 4, 1958

2,858,683

TIMING DEVICE FOR FUEL INJECTION PUMP

Emil V. Szlaga, Centerline, Mich., assignor, by mesne assignments, to Continental Motors Corporation, Muskegon, Mich., a corporation of Virginia Application April 11, 1956, Serial No. 577,591

4 Claims. (Cl. 64—25)

This invention relates to internal combustion engines of the fuel injection type, and more particularly to an automatic fuel injection pump timing control device for advancing and retarding the fuel injuction timing in relation to engine speed.

Just as the spark ignition of an internal combustion engine must be properly timed in relation to the engine speed for most effective combustion, so the injection of fuel in engines utilizing fuel injection systems needs to be properly timed. Best engine performance and more economical fuel consumption is obtained by timing the moment fuel is injected into the cylinder or the air intake relative to the engine speed. Various types of fuel injection pumps, pump controls and injection nozzle controls have been developed to achieve proper timing, but these depend on rather complex mechanisms which are difficult to adjust and maintain in proper timing.

This invention, utilizing a fuel injection pump driven by suitable gearing from the engine, is operable to directly advance or retard the timing of the fuel injection pump operation by constructing an adjustable fluid coupling drive operating in series with the fuel pump drive itself.

In particular, an object of the present invention is to improve fuel injection engine performance by providing a means for automatically timing the fuel injection in relation to engine speed.

Another object of the present invention is to facilitate fuel injection pump control by providing an adjustable fluid coupling in the injection pump driving mechanism.

A further object of the invention is to provide a fuel injection engine with an automatic fuel injection engine pump timing mechanism by constructing a pump driving means having an adjustable fluid coupling and an automatic actuating valve responsive to engine speed and operable to advance and retard the pump timing by altering the operative relationship of the fluid coupling driving and driven components.

For a more complete understanding of the invention, reference may be had to the accompanying drawings illustrating a preferred embodiment of the invention in which like characters refer to like parts throughout the several views and in which—

Fig. 1 is a cross-sectional longitudinal view of a portion of an internal combustion engine embodying the invention.

Fig. 2 is a cross-sectional view taken substantially on line 2—2 of Fig. 1.

Fig. 3 is a cross-sectional view taken substantially on the line 3—3 of Fig. 1.

Fig. 4 is a cross-sectional view taken substantially on the line 4—4 of Fig. 1.

Fig. 5 is a cross-sectional view taken substantially on the line 5—5 of Fig. 1.

Fig. 6 is a cross-sectional view taken substantially on the line 6—6 of Fig. 4, and Fig. 7 is a cross-sectional view taken substantially on the line 7—7 of Fig. 4.

Referring to Fig. 1, a portion of an internal combustion engine 10 is illustrated as having a supporting frame 11, a fuel injection pump 12, and other accessories such as a fan gear box 13. A pump and accessory drive shaft 14 is rotatably supported by the engine frame 11 as by bearing 15 and has means for being driven from the engine crankshaft such as a crankshaft gear 16 and a driven gear 17 splined or otherwise secured to the shaft 14.

More particularly, the engine as illustrated herein comprises a V-type engine and the axis of said drive shaft 14 is preferably disposed in the central vertical engine plane and lies midway of the two banks of engine cylinders. Obviously this invention may be incorporated with other types of engines.

A fluid coupling indicated as a whole by the reference character 20, comprises a substantially cylindrical two part housing or casing 21, rotatably supported on the shaft 14 and having a pinion gear 22 for preferably directly driving gears 23 which operate a pair of separate or independent fuel injection pumps 12 through shafts 24 as shown in Fig. 5. The housing 21 has a fluid-filled chamber 25 and fluid driven vanes 26 secured therein, as illustrated in Fig. 2. Fluid driving vanes 27 are splined to the shaft 14 as at 28 or otherwise secured for rotation with the shaft 14. As will be seen, the housing 21 may be annularly shifted or rotated about the axis of shaft 14 in either direction, and is provided with stops 29 for limiting movement of the housing 21 by contacting the driving vanes 27.

The shifting of the vanes 26 relative to the vanes 27 is accomplished hydraulically, by means of a control mechanism 35, in the housing 21 but preferably separated from the chamber 25 by a wall section 36. The control mechanism is illustrated in Fig. 4.

A support member 37 is splined or otherwise secured to the shaft and rotates therewith and within a compartment 38 of the housing 21. An arm 39 is pivotally carried by the support 37 on an eccentrically mounted pivot pin 40, as shown in Fig. 7, which provides an adjustable fulcrum. One end of the arm 39 supports a weight 41, which is thrown outward toward the dotted line position 42 against the tension of a spring 43 at higher engine speeds, and may be pulled inward by the spring 43 toward the dotted line position 44 at lower engine speeds as the centrifugal forces diminish.

A valve assembly 50 is provided and the valve housing 51 is secured to the wall 36 by bolts 36a or other means and operatively supports a piston 52. The other end of the weighted arm 39 is operably connected by a link 53 to the valve piston 52. The valve housing 51 is provided with a pressure inlet port 54 and pressure outlet ports 55 and 56, and the ends of the housing are open to provide exhausts. As shown in Fig. 3, the wall section 36 is provided with a pressure passage 57 connecting the valve pressure inlet port 54 with a lubricating oil pressure passage 58 provided interiorly of the shaft 14. Thus fluid pressure is continuously ported to the central portion of the valve 50. The piston 52 normally blocks the pressure outlet ports 55 and 56. This is referred to as the equilibrium position, in which no oil flows in either direction through the ports. When the engine speeds up or slows down, the piston 52 will be shifted out of equilibrium to one side or the other, opening one pressure outlet port to the fluid pressure and opening the other pressure outlet port to exhaust. The port 55 communicates with connecting passages 55a, 55b, and 55c, provided in the wall section 36, and the port 56 similarly communicates with connecting passages 56a, 56b and 56c.

The housing chamber 25 is divided by the vanes 26 and 27 into compartments A, B, C and D. Compartments B and D communicate with the passages 55a, 55b and 55c through ports 60 and 61, and the compartments A and C communicate with the passages 56a, 56b and 56c through ports 62 and 63.

In operation, the shaft 14 rotates in direct relation to engine speed. For the purpose of discussion, assume the normal engine speed to be such that the weight 41 of the control mechanism 35 assumes the position shown by solid lines in Fig. 4, centrifugal force tending to throw the weight 41 outward, being balanced by the tension of the spring 43. The initial position of the vanes 26 and 27 is further assumed to be in the position illustrated in Fig. 2. The chamber 25 being filled with non-compressible lubricating oil, the vanes 27 splined to the shaft 14, effectively drive the vanes 26 of the housing 21, and the housing therefore rotates at the same speed as the shaft 14, operating the fuel injection pumps 12 through pinion 22 and gears 23 and in a predetermined timed relationship to the engine speed.

Now, when the engine speed increases, it becomes desirable to advance the timing of the pump operation. This is effected by angularly displacing the housing 21 relative to the shaft 14, which is driven from the crankshaft. This displacement is accomplished automatically in the fluid coupling 20 as follows:

An increase in speed causes the weight 41 to swing outward toward the dotted line position 42 shown in Fig. 4. The arm 39, pivoted about the point 40, operates to actuate the piston 52 to the left out of its aforesaid equilibrium position. The ports 54 and 55 are thus communicated and the port 56 is open to the exhaust opening at the right end of the valve housing 51. Oil under pressure from the passage 58 in the shaft 14 passes through the passage 57 into the valve 50 through the pressure inlet port 54 and out the pressure outlet port 55. The oil is thus forced through the passages 55a, 55b and 55c to the ports 60 and 61, and finally into the compartments B and D. The vanes defining these compartments are thus forced apart. The housing 21 shifts in a clockwise direction, as viewed in Fig. 2, thus altering the timing of the pumps 12 driven by the housing 21. Housing shift is limited by the stops 29 coming in contact with the vanes 27.

The oil in compartments A and C is forced out the ports 62 and 63, through the passages 56a, 56b and 56c, and finally out the port 56 of the valve 50 to be exhausted into the compartment 38. The end of the housing 21 shown in Fig. 5 is provided with openings 70 to permit flow of oil into the interior of the engine.

The shifting of the housing 21, as seen in Fig. 4, will be counterclockwise, since Figs. 2 and 4 are oppositely directed sections. Since the valve housing 51 is secured to the wall section 36 of the housing 21, the counterclockwise shift as seen in Fig. 4 will move the valve housing 51 to the left, causing the piston to move back to the aforesaid equilibrium position, closing off the ports 55 and 56, trapping the oil in compartments B and D to retain the housing in its shifted position.

When engine speed decreases, the weight 41 is pulled inward by the spring 43 toward the dotted line position 44, actuating the piston out of equilibrium to the right. The flow of oil then will be into the compartments A and C and out of the compartments B and D. The housing will be shifted counterclockwise as seen in Fig. 2 and clockwise as seen in Fig. 4, thereby retarding the timing of the pump operation relative to the degree of decrease in engine speed.

The only adjustment necessary in the mechanism 35 is by turning the eccentric pivot 40 shown in Figs. 4 and 7, which shifts the fulcrum of the arm 39 to effect an adjustment of the position of the piston 52 relative to the position of the housing 51.

Although I have described only one embodiment of the invention, it will be apparent to one skilled in the art to which the invention pertains that various changes and modifications may be made without departing from the spirit of the invention or the scope of the appended claims.

I claim:

1. A timing device adapted for timing internal combustion engine fuel injection pumps relative to engine speed and comprising a driving shaft, a driven shaft axially aligned with said driving shaft, and a fluid coupling mechanism operatively connecting said driving and driven shafts and operable to selectively angularly adjust the relative positions of said shafts in response to variations of driving shaft speed, said fluid coupling mechanism comprising a housing structure secured to said driven shaft and rotatably carried on said driving shaft, said housing structure having a fluid chamber circumferentially disposed with respect to said driving shaft and provided with driven vanes extending radially inwardly in said chamber, said driving shaft provided with driving vanes extending radially outwardly in said chamber and disposed alternately with respect to said driven vanes to divide said fluid chamber into a plurality of separate adjacent arcuate fluid compartments, a control mechanism disposed exteriorly of said chamber and comprising a fluid control valve carried by said housing and a speed responsive element carried by said driving shaft, said fluid control valve having a pressure inlet and an exhaust outlet, said housing provided with passages connecting said control valve with said fluid compartments, adjustable means operatively connecting said valve with said speed responsive element and actuated by changes in shaft speed to selectively connect adjacent fluid compartments respectively with said pressure inlet and said exhaust outlet to effect a fluid pressure increase and decrease respectively in adjacent fluid compartments for relatively angularly shifting the positions of said driving and driven vanes.

2. A timing device adapted for timing internal combustion engine fuel injection pumps relative to engine speed and comprising a driving shaft, a driven shaft axially aligned with said driving shaft, and a fluid coupling mechanism operatively connecting said driving and driven shafts and operable to selectively angularly adjust the relative positions of said shafts in response to variations of driving shaft speed, said fluid coupling mechanism comprising a housing structure secured to said driven shaft and rotatably carried on said driving shaft, said housing structure having a fluid chamber circumferentially disposed with respect to said driving shaft and provided with driven vanes extending radially inwardly in said chamber, said driving shaft provided with driving vanes extending radially outwardly in said chamber and disposed alternately with respect to said driven vanes to divide said fluid chamber into a plurality of separate adjacent arcuate fluid compartments, said housing having a wall at one side of said chamber and disposed in a plane substantially normal to the axis of said shafts, a control mechanism disposed exteriorly of said chamber and comprising a fluid control valve carried on said housing wall and a speed responsive element carried by said driving shaft, said housing wall provided with a pressure inlet passage connected with a source of fluid pressure and two other passages openly connected respectively with adjacent fluid compartments, said fluid control valve having a pressure inlet connected with said pressure inlet passage, two exhaust outlets, and two control ports respectively connected with said two other passages, adjustable means operatively connecting said valve with said speed responsive element and actuated by changes in driving shaft speed to selectively connect one of said control ports with said pressure inlet and the other of said control ports with one of said exhaust outlets to effect a fluid pressure increase and decrease respectively in adjacent fluid compartments for relatively angularly shifting the positions of said driving and driven vanes.

3. A timing device adapted for timing internal combustion engine fuel injection pumps relative to engine speed and comprising a driving shaft, a driven shaft axially aligned with said driving shaft, and a fluid coupling mechanism operatively connecting said driving and driven shafts and operable to selectively angularly adjust the relative positions of said shafts in response to variations of driving shaft speed, said fluid coupling mechanism comprising a housing structure secured to said driven shaft and rotatably carried on said driving shaft, said housing structure having a fluid chamber circumferentially disposed with respect to said driving shaft and provided with driven vanes extending radially inwardly in said chamber, said driving shaft provided with driving vanes extending radially outwardly in said chamber and disposed alternately with respect to said driven vanes to divide said fluid chamber into a plurality of separate adjacent arcuate fluid compartments, said housing having a wall at one side of said chamber and disposed in a plane substantially normal to the axis of said shafts, a control mechanism disposed exteriorly of said chamber and comprising a fluid control valve carried on said housing wall and a speed responsive element carried by said driving shaft, said housing wall provided with a pressure inlet passage connected with a source of fluid pressure and two other passages openly connected respectively with adjacent fluid compartments, said fluid control valve having a pressure inlet connected with said pressure inlet passage, two exhaust outlets, and two control ports respectively connected with said two other passages, adjustable means operatively connecting said valve with said speed responsive element and actuated by changes in driving shaft speed to selectively connect one of said control ports with said pressure inlet and the other of said control ports with one of said exhaust outlets to effect a fluid pressure increase and decrease respectively in adjacent fluid compartments for relatively angularly shifting the positions of said driving and driven vanes, said speed responsive element comprising a support member splined to said driving shaft, an arm pivotally carried by said support member and connected to said control valve, a weight carried by said arm and operable to actuate said arm in response to centrifugal force, and a spring means connecting said arm and said support member resiliently urging said arm oppositely against centrifugal force.

4. A timing device adapted for timing an internal combustion engine fuel injection pump and comprising a driving shaft, a driven shaft axially aligned therewith, and an adjustable fluid coupling drivingly connecting said driving and driven shafts, said fluid coupling comprising a rotatable housing structure drivingly connected to said driven shaft, said housing having a fluid chamber, fluid driven vanes in said chamber and supported by said housing, driving vanes in said chamber and drivingly connected to said driving shaft, said fluid driven vanes disposed alternately with same into a plurality of compartments, and a speed responsive means operable to adjust the position of said fluid driven vanes with respect to the position of said driving vanes to selectively adjust the relative angular positions of said driving and driven shafts in response to changes in the speed of said driving shaft, said speed responsive means comprising a selectively adjustable hydraulic valve having vent outlets, a fluid pressure inlet connected with a source of fluid pressure supply and fluid pressure outlets connected with said fluid chamber compartments, and means operating said valve in response to changes in the speed of said driving shaft to selectively vent and pressurize alternate compartments of said fluid chamber whereby to selectively adjust the relative positions of said driven and driving vanes, said valve carried by said housing structure, said valve operating means carried by said driving shaft and comprising a support, an arm pivotally secured to said support and operably connected to said valve, a weight carried by said arm and movable about said pivot in response to centrifugal forces of said driving shaft, means balancing said counterweight against said centrifugal forces, and said arm connected to said valve and operable to actuate same.

References Cited in the file of this patent
UNITED STATES PATENTS

| 2,708,353 | Brady | May 17, 1955 |
| 2,708,354 | Brady et al. | May 17, 1955 |

FOREIGN PATENTS

| 56,811 | Great Britain | Nov. 30, 1942 |

UNITED STATES PATENT OFFICE
CERTIFICATE OF CORRECTION

Patent No. 2,858,683                                                          November 4, 1958

Emil V. Szlaga

It is hereby certified that error appears in the printed specification of the above numbered patent requiring correction and that the said Letters Patent should read as corrected below.

Column 6, line 11, after "with" insert -- respect to said driven vanes in said chamber to divide --.

Signed and sealed this 19th day of April 1960.

(SEAL)
Attest:

CARL H. AXLINE
Attesting Officer

ROBERT C. WATSON
Commissioner of Patents